(12) United States Patent
Chen (10) Patent No.: US 9,462,111 B1
(45) Date of Patent: Oct. 4, 2016

(54) WEARABLE ELECTRONIC DEVICE HAVING SHORT-RANGE WIRELESS COMMUNICATION ELEMENT FOR UPDATING INFORMATION

(71) Applicant: FuelStation Inc., Apia (WS)

(72) Inventor: Mike Chen, New Taipei (TW)

(73) Assignee: FUELSTATION INC., Apia (WS)

( * ) Notice: Subject to any disclaimer, the term of this patent is extended or adjusted under 35 U.S.C. 154(b) by 0 days.

(21) Appl. No.: 15/073,926

(22) Filed: Mar. 18, 2016

(30) Foreign Application Priority Data

Dec. 31, 2015 (TW) .............................. 104144673 A (51) Int. Cl.
*H04M 1/00* (2006.01)
*H04M 1/725* (2006.01)
*H04M 1/04* (2006.01)

(52) U.S. Cl.
CPC ........... *H04M 1/72558* (2013.01); *H04M 1/04* (2013.01); *H04M 1/7253* (2013.01); *H04M 1/72569* (2013.01); *H04M 1/72572* (2013.01)

(58) Field of Classification Search
CPC ............... H04M 1/05; H04M 1/6066; H04M 1/72513; H04M 1/72519; H04M 1/72533; H04M 1/72544; H04M 1/72547; H04M 1/72561; H04M 1/72569; H04M 2250/12; H04M 2250/74

USPC ....................................................... 455/552.1
See application file for complete search history.

(56) References Cited

U.S. PATENT DOCUMENTS

| | | | |
|---|---|---|---|
| 2003/0152231 A1* | 8/2003 | Tomita ............... | G07C 9/00103 380/258 |
| 2014/0173082 A1* | 6/2014 | Shin ........................ | H04L 41/24 709/223 |
| 2015/0095041 A1* | 4/2015 | Kim .................... | G06F 19/3418 705/2 |

* cited by examiner

*Primary Examiner* — Ajibola Akinyemi
(74) *Attorney, Agent, or Firm* — Bacon & Thomas, PLLC (57) ABSTRACT

The present invention is to provide a wearable electronic device applied to an electronic commerce system, wherein the wearable electronic device is configured to be in communication with an information management server located in a cloud end through short-range wireless communication between the wearable electronic device and a network communication device, the wearable electronic device is also able to play audio files, store audio property of the audio files as an audio preference record and transmit the audio preference record to a streaming audio server located in the cloud end through the network communication device and the information management server sequentially, and the streaming audio server can then directly update the audio file stored in the wearable electronic device according to the audio preference record through the network communication device, so as for the client to enjoy the latest and favorite audio during sport through wearing the wearable electronic device.

36 Claims, 5 Drawing Sheets

WEARABLE ELECTRONIC DEVICE HAVING SHORT-RANGE WIRELESS COMMUNICATION ELEMENT FOR UPDATING INFORMATION

FIELD OF THE INVENTION

The present disclosure generally relates to a wearable electronic device, more particularly to a wearable electronic device without having to be installed with large volume of memories and rechargeable battery and capable of periodically uploading information stored therein to a server located in a cloud end and downloading audio files from the server for client to listen only through short-range wireless communication elements installed in the wearable electronic device and a network communication device respectively.

BACKGROUND OF THE INVENTION

In recent year, with rapid development of electronic and communication technology, a handheld electronic device (such as a smart watch, a smart phone, a tablet computer and so on) has not only a strong communication function but also various application functions for meeting a user's demand in daily life, work, social intercourse and entertainment, for example, the functions of noting, timer, counting, scheduling, lighting, taking picture, recording video, GPS, drawing, statistical computing, meeting, investment, withdrawing money, shopping, booking ticket, making a reservation, ordering food, chat, social intercourse, game and so on. Therefore, the handheld electronic devices become important devices indispensable for most modern people, and the scene that everyone holds a wearable device also becomes ubiquitous in an urban area.

A mobile telephone of iPhone series, manufactured by Apple Inc., is taken as an example for illustration. In order to meet the constant trend that people have to use mobile telephone anywhere and anytime, the Apple Inc. changes the shape design of the mobile telephone of iPhone series from a compact, light and small-sized shape (a length, a width and a thickness of the first-generation iPhone respectively are 115 mm, 61 mm and 11.6 mm) to a thinner and larger-sized shape (a length, a width and a thickness of the latest-generation iPhone respectively are 158.1 mm, 77.8 mm and 7.1 mm), so as to facilitate people to hold the iPhone by hand and view screen clearly. This trend in shape design also drives other mobile telephone manufactures to jump onto the bandwagon, so as to enable the mobile telephone with a big screen and an ultra-thinness to become current mainstream for the smart phone. The conventional mobile telephone with the compact and small-sized shape is suitable to be placed in a pocket of clothes or pants, but the current mobile telephone is not suitable, so the scene of everyone holding a wearable device is ubiquitous in urban area.

Holding a smart phone on hand can satisfy the person's inexplicable demand, but it also require the person to hold the smart phone on hand or hang the smart phone on wrist or arm for just listening audio (such as music, news, audio-book and so on) during sport, mountain climbing, hiking or other leisure activity, which causes inconvenience in the activity, and people may fall or throw the mobile telephone to drop on the ground from the hand, wrist or arm because of personal carelessness or collision by other person or object, so as to damage the mobile phone or its display. Besides, the smart phone dropped on the ground may also be trample by other person or rolled by a passing vehicle, to be completely broken and not available. In this case, the owner of the smart phone has no idea who to claim reparation and also feels miserable and loses interest in activity.

What is need is to design a wearable electronic device to be a more compact and lighter device having less power consumption. Such wearable device can be worn on the client conveniently and just needs a small rechargeable battery to provide the client to measure the body signal and listen to audio for a considerable time, and can further obtain the latest and most diverse audio file for the client to listen based on the client's preference. By using the wearable electronic device, the client can do lightly-armed leisure activity.

SUMMARY OF THE INVENTION

An objective of the present disclosure is to provide a wearable electronic device having a short-range wireless communication element for updating information stored therein, and applied to an electronic commerce system comprising the wearable electronic device, at least one network communication device, an information management server and at least one streaming audio server. The network communication device is respectively linked with the information management server and the at least one streaming audio server through internet network, so as to transmit information to the information management server or receive an audio file from the at least one streaming audio server, and the wearable electronic device is configured to be in communication with the network communication device to receive the information or the audio file from the network communication device or transmit the information to the network communication device. The wearable electronic device comprises a storage element, an audio play element, the short-range wireless communication element and a microprocessor. The storage element is configured to store a plurality of application programs and a plurality of audio files. The audio play element is configured to play the plurality of audio files stored in the storage element. The short-range wireless communication element is configured to be in short-range communication with the network communication device, so as to receive the information or the audio file from the network communication device or transmit the information to the network communication device. The microprocessor is electrically connected to the storage element, the audio play element and the short-range wireless communication element respectively, and configured to execute the plurality of application programs to control the audio play element to play the plurality of audio files, and store the audio property of the audio file being played by the audio play element in the storage element to be an audio preference record. The microprocessor is further configured to be in short-range communication with the network communication device through the short-range wireless communication element for transmitting information (such as audio preference record) to the network communication device, or receiving the information and audio file from the network communication device. Therefore, the client can control the wearable electronic device to be in communication with the network communication device first, to transmit the audio preference record to the streaming audio server through the network communication device and the information management server in sequential order. The streaming audio server can store the audio file corresponding to the audio preference record to the wearable electronic device through the network communication device. While going out to sport, the client can enjoy the favorite audio during sport by just wearing the wearable electronic device.

The other objective of the present disclosure is to provide the wearable electronic device which is formed by two separate devices including a broadcast part and a relaying part. The relaying part is configured to execute the application programs, to control the audio play element to play the audio files by push technology through the connection between the relaying short-range wireless communication element and a short-range wireless communication and broadcast element of the broadcast part, the store an audio property of the audio file being played by the audio play element in the storage element to be an audio preference record. The relaying part is further configured to interchange and update the information of the plurality of application programs, the audio files and audio preference record with the network communication device by the short-range communication through the relaying short-range wireless communication element. Therefore, when going out to sport, the client can enjoy audio during sport by just wearing the broadcast part (such as the headphone) and the relaying part (such as the electronic band). In addition, the wearable electronic device (that is a headphone and an electronic band) is more compact and lighter, so the client can enjoy fun of lightly armed sport.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 1:
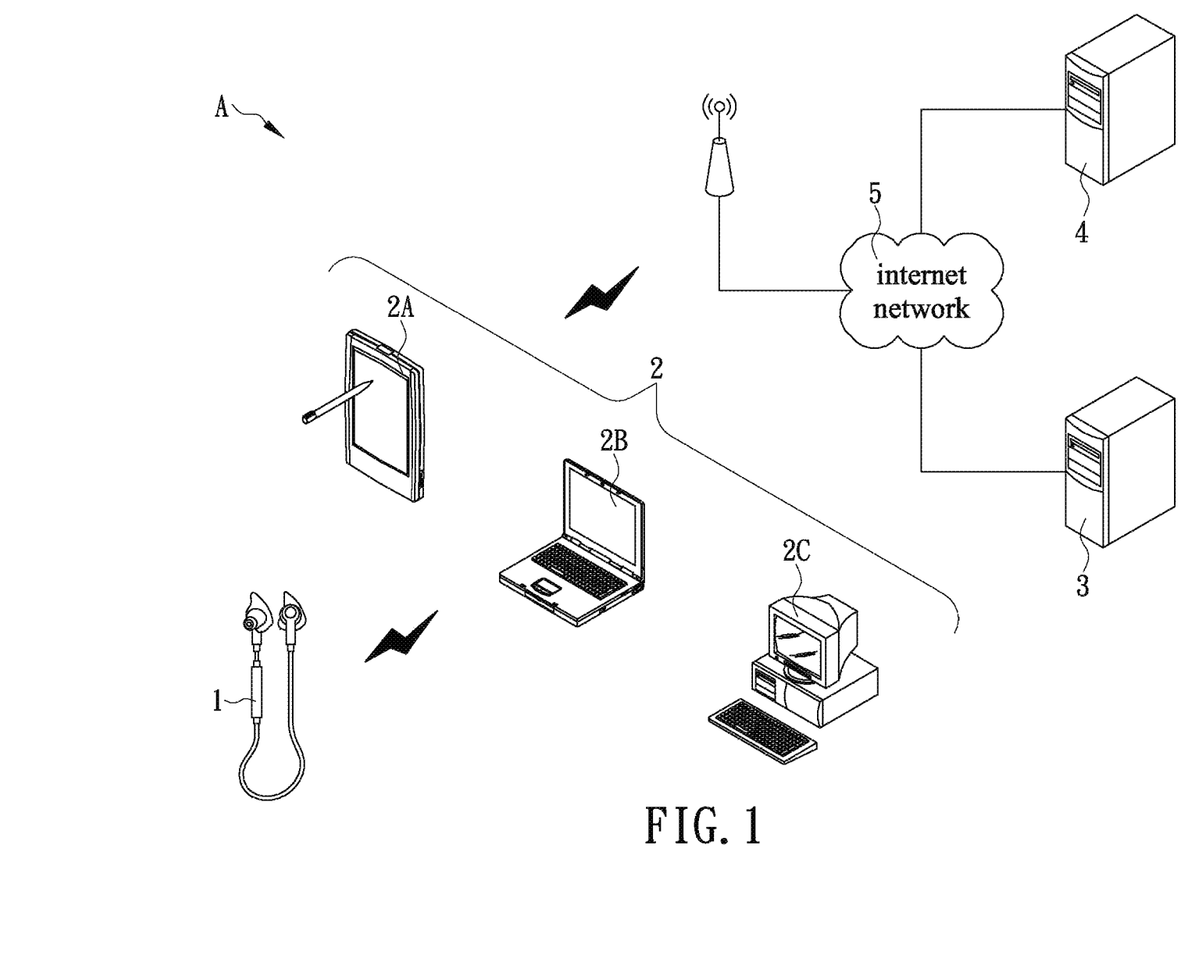
FIG. 1 is a schematic view of an electronic commerce system of the present disclosure.

The present disclosure provides a wearable electronic device having a short-range wireless communication element for updating information, and the wearable electronic device can be applied to an electronic commerce system. Please refer to FIGS. 1 and 2. In a first embodiment, the electronic commerce system A includes the wearable electronic device 1, at least one network communication device 2, an information management server 3 and at least one streaming audio server 4. In the electronic commerce system A, the wearable electronic device 1 and the network communication device 2 are in communication with each other through a short-range wireless communication technology, such as the network protocol including Bluetooth, near field communication (NFC), ZigBee, ANT (a self-defined protocol of Dynastream Innovations Inc.), so as to interchange information and file therebetween. The network communication device 2 (such as a smart phone 2A, a tablet computer or notebook computer 2B, a desktop computer 2C or a charging device (such as mobile power supply) having network communication function) can be respectively linked with the information management server 3 and the at least one streaming audio server 4 through the internet network 5, so as to transmit information to the information management server 3 for management and storage, or respectively receive an audio file M (such as music, news, audiobook and so on) from the at least one streaming audio server 4. The network communication device 2 can be linked with the internet network 5 by wired network (such as Ethernet, power-line network) or wireless network (such as Wi-Fi).

Please refer back to FIGS. 1 and 2. In the first embodiment, the wearable electronic device 1 is a headphone including a microprocessor 10, a storage element 11, an audio play element 12 and a short-range wireless communication element 13. The microprocessor 10 is electrically connected to the storage element 11, the audio play element 12 and the short-range wireless communication element 13 respectively, for transmitting information or control signals to these elements and receiving information from the storage element 11 and the short-range wireless communication element 13. The storage element 11 is configured to store a plurality of application programs 111 (such as music play programs 111A including KKBOX, Windows Media Player, MixerBox, ttplayer and soon, and the wireless communication programs 111B including Bluetooth, NFC and so on), and store the audio file M (such as music, news, audiobook and so on) transmitted from the network communication device 2. The audio play element 12 is configured to play the audio file M stored in the storage element 11. The short-range wireless communication element 13 is configured to be in communication with the network communication device 2 through the short-range wireless communication technology, to receive the information or the audio file M from the network communication device 2. It should be noted that the short-range wireless communication element 13 can be a Bluetooth communication element, an NFC communication element, a ZigBee communication element, an ANT communication element or the like, based on the interconnection between the short-range wireless communication element 13 and the network communication device 2; alternatively, the short-range wireless communication element 13 can include multiple different communication elements with different short-range wireless communication technologies.

Please refer back to FIGS. 1 and 2. After the microprocessor 10 executes a music play program 111A, the audio file M stored in the storage element 11 can be played by the audio play element 12 for client to listen. In the first embodiment, the music play program 111A can record the audio property of the audio file being played by the audio play element 12. Preferably, the audio property includes a singer name, a band name, a music style, a news type, an author name, an audiobook style, a play time and so on. The microprocessor 10 stores the audio property to the storage element 11 to be an audio preference record 112. However, in other embodiment of the present disclosure, the manufacturer can extra install an application program 111 to record the audio property. Any way of enabling the microprocessor 10 to store the audio property of the audio file being played by the audio play element 12 to be the audio preference record 112, is covered within the spirit and scope of the appended claims.

Please refer back to FIGS. 1 and 2. After the microprocessor 10 executes a wireless communication program 111B, the microprocessor 10 can be in short-range communication with the network communication device 2 through the short-range wireless communication element 13, to transmit the information of the plurality of application programs 111, the audio file M and the audio preference record 112 to the network communication device 2, and the network communication device 2 can be in communication with the interne network 5 through long-range communication to transmit the information to a corresponding server subsequently. The network communication device 2 can also receive the information transmitted from the server, and then transmit the information (such as the information of the application programs 111, the audio file M and the audio preference record 112) to the wearable electronic device 1 through the short-distance communication for interchanging and updating the information.

Please refer back to FIGS. 1 and 2. In the first embodiment, with cooperation with the network communication device 2, the wearable electronic device 1 is interconnected with the network communication device 2 through the short-distance communication and then uploads the audio preference record 112 to the information management server 3 through the network communication device 2 for management and storage. Moreover, the information management server 3 can also transmit the audio preference record 112 to the streaming audio server 4, so that the streaming audio server 4 can download the audio file M corresponding to the audio preference record 112, to the wearable electronic device 1 through the network communication device 2. When going out to sport, the client can listen to favorite audio during sport by just wearing the wearable electronic device 1 without carrying the smartphone or MP3 player. Generally speaking, the long-range communication element (such as Ethernet communication element, and Wi-Fi communication element) has a higher power consumption than the short-distance communication element, and requires additional communication connection interface, so an electronic product having the long-range communication element usually must be provided with a large volume of rechargeable battery, and has a larger size for accommodating the additional communication connection interface. However, the wearable electronic device 1 of the present disclosure is just in the short-range communication with the network communication device 2 for interchanging and updating information, so it is not necessary to dispose the long-range communication element, the large volume of memory and rechargeable battery in the wearable electronic device 1. Therefore, the wearable electronic device 1 of the present disclosure can be more easily designed as a more compact and lighter device having less power consumption, and can be worn on the client conveniently to provide the client to enjoy audio during sport in a considerable time by just a smaller volume of rechargeable battery.

Figure 3A:
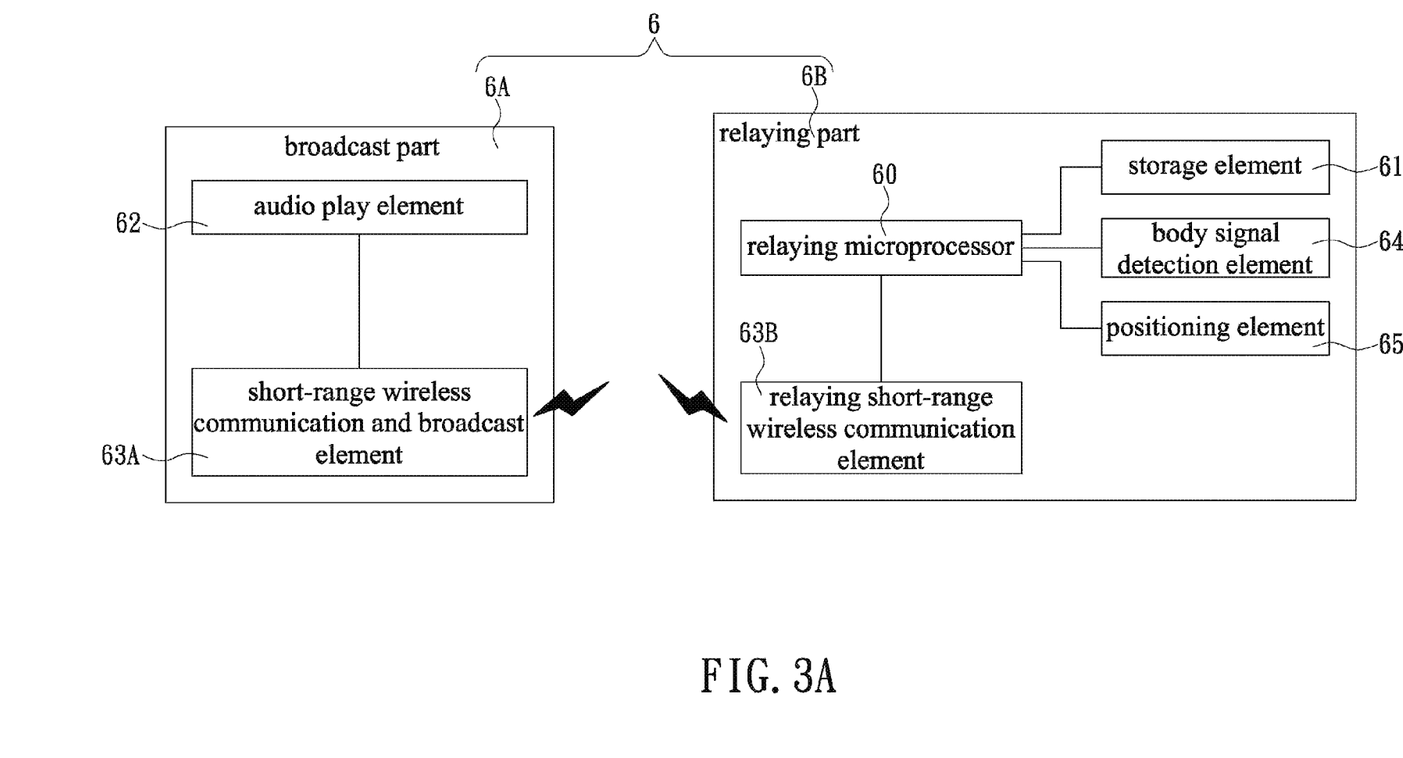
FIG. 3A is a block diagram of hardware architecture of a second embodiment of a wearable electronic device of the present disclosure.
Figure 3B:
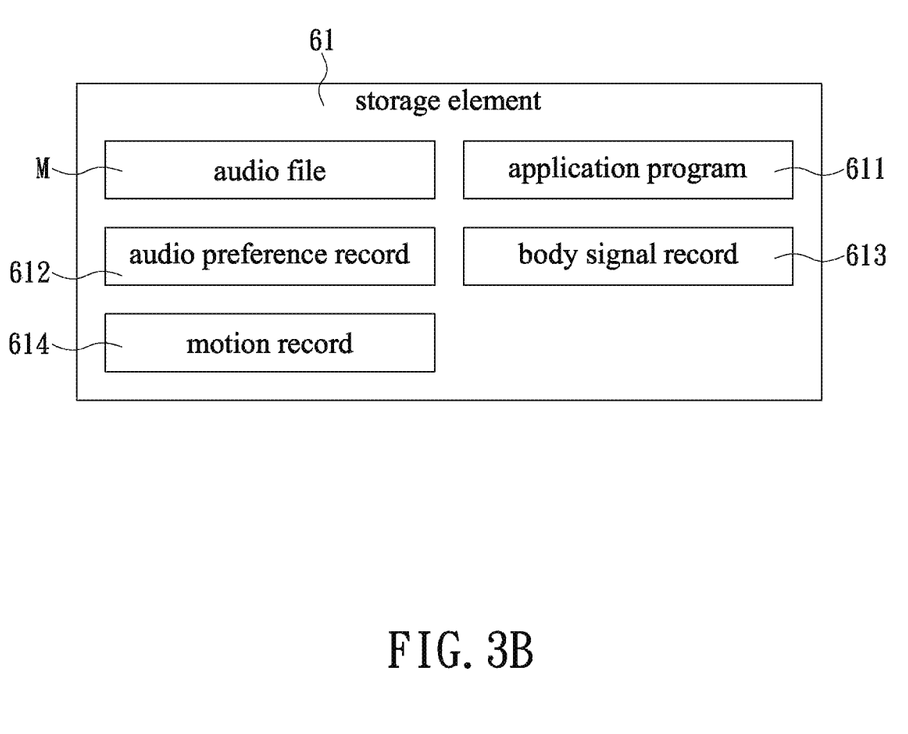
FIG. 3B is a block diagram of a storage element of the second embodiment of the wearable electronic device of the present disclosure.
Figure 4:
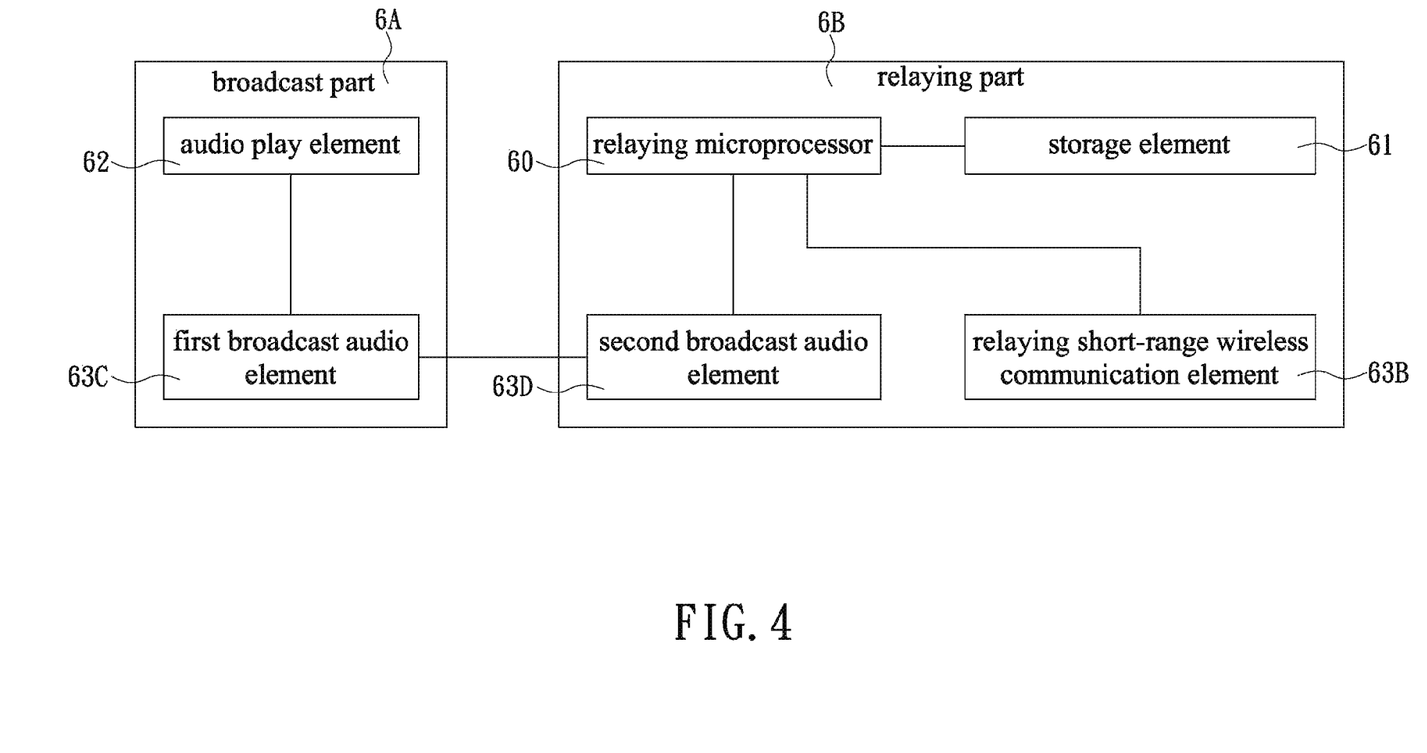
FIG. 4 is a block diagram of hardware architecture of a third embodiment of the wearable electronic device of the present disclosure.

In the first embodiment, the headphone is taken as an example of single-device implementation, but the manufacturer can use two separate devices to implement the wearable electronic device upon the user's requirement. Please refer to FIGS. 1, 3A and 3B. The wearable electronic device 6 includes a broadcast part 6A and a relaying part 6B. The broadcast part 6A can be a headphone, and the relaying part 6B can be an electronic band. The broadcast part 6A includes an audio play element 62 and a short-range wireless communication and broadcast element 63A configured to receive the audio file M from an external device. The audio play element 62 is electrically connected with the short-range wireless communication and broadcast element 63A and configured to play the audio file M. The relaying part 6B includes a relaying microprocessor 60, a storage element 61 and a relaying short-range wireless communication element 63B. The relaying microprocessor 60 is respectively electrically connected to the storage element 61 and the relaying short-range wireless communication element 63B for transmitting information therebetween. The relaying short-range wireless communication element 63B can be respectively interconnected with the network communication device 2 and the short-range wireless communication and broadcast element 63A through the short-range wireless communication technology, so as to receive the audio file M from the network communication device 2 and transmit the audio file M to the short-range wireless communication and broadcast element 63A through a push technology. In the second embodiment, the broadcast part 6A and the relaying part 6B are linked by a wireless manner; however, in a third embodiment of the present disclosure, the broadcast part 6A and the relaying part 6B can be linked by a wired manner. As shown in FIG. 4, the short-range wireless communication and broadcast element 63A can be replaced by a first broadcast audio element 63C, and the relaying part 6B is extra provided with a second broadcast audio element 63D, and the first and second broadcast audio elements 63C and 63D are interconnected by an audio cable.

Please refer back to FIGS. 1, 3A and 3B. The storage element 61 is configured to store a plurality of application programs 611 and a plurality of audio files M. After executing the application programs 611, the relaying microprocessor 60 controls the audio play element 62 to broadcast the audio files M by the push technology through the relaying short-range wireless communication element 63B and the short-range wireless communication and broadcast element 63A in sequential order. In addition, the relaying microprocessor 60 stores the audio property of the audio file M being played by the audio play element 62 in the storage element 61 to be an audio preference record 612, and interchanges and updates the information of the plurality of application programs 611, the audio file M and the audio preference record 612 with the network communication device 2 through the relaying short-range wireless communication element 63B.

Please refer back to FIGS. 1, 3A and 3B. In the fourth embodiment of the present disclosure, the relaying part 6B further includes at least one body signal detection element 64 (such as a detection element capable of measuring the client's temperature, heartbeat, blood pressure or consumed calories). The body signal detection element 64 is electrically connected with the relaying microprocessor 60 and configured to measure a client body signal (such as body information including temperature, heartbeat or blood pressure). After executing the corresponding application program 611, the relaying microprocessor 60 stores the client body signal to the storage element 61 as a body signal record 613, and interchanges and updates the information of the body signal record 613 with the network communication device 2 by the short-range communication through the relaying short-range wireless communication element 63B. Therefore, the network communication device 2 can transmit the body signal record 613 to the information management server 3 through the internet network 5 for management and storage.

Figure 2:
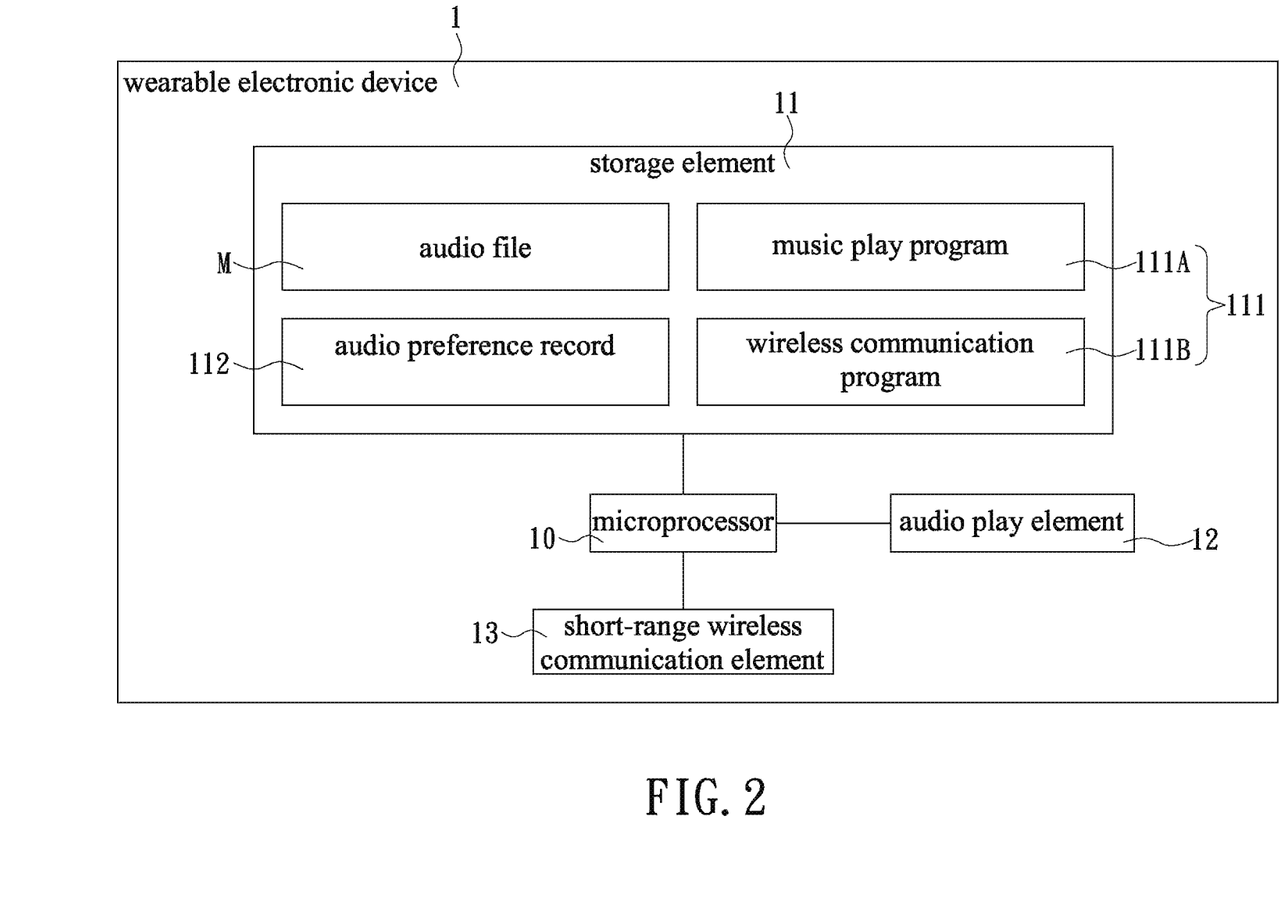
FIG. 2 is a block diagram of hardware architecture of a first embodiment of a wearable electronic device of the present disclosure.

Please refer back to FIGS. 1, 3A and 3B. In the fifth embodiment of the present disclosure, the relaying part 6B further includes at least one positioning element 65. Preferably, the positioning element 65 can be a GPS element, a barometer, a magnetometer, a gyroscope or an accelerometer. The relaying microprocessor 60 is electrically connected with the at least one positioning element 65, and respectively receives motion messages (such as messages of the client's motion speed, motion altitude, or motion trajectory) measured by the positioning element 65 and stores the motion messages in the storage element 61 to be a motion record 614. After executing the corresponding application program 611, the relaying microprocessor 60 interchanges and updates the information of the motion record with the network communication device 2 through the relaying short-range wireless communication element 63B. It should be noted that when the wearable electronic device is a single device as described in first embodiment (as shown in FIG. 2), the body signal detection element 64 and the positioning element 65 are electrically connected with the microprocessor 10.

Please refer back to FIG. 1. In a sixth embodiment of the present disclosure, basic information (such as a client name, a mailing address, a device identifier and a password) set by the client is stored in the storage element 11 of the wearable electronic device 1. When the wearable electronic device 1 and the network communication device 2 are in communication with each other, the wearable electronic device 1 transmits the basic information set by the client to the network communication device 2, so that the network communication device 2 can obtain the basic information set by the client and then transmit the basic information to the information management server 3 and the streaming audio server 4. However, in other embodiments of the present disclosure, the basic information set by the client can also be stored in the network communication device 2, to provide the client to edit the basic information through the network communication device 2.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A wearable electronic device having a short-range wireless communication element for updating information stored therein, and applied to an electronic commerce system comprising the wearable electronic device, at least one network communication device, an information management server and at least one streaming audio server, wherein the network communication device is respectively linked with the information management server and the at least one streaming audio server through internet network, so as to transmit information to the information management server or receive an audio file from the at least one streaming audio server, and the wearable electronic device is configured to be in communication with the network communication device to receive the information or the audio file from the network communication device or transmit the information to the network communication device, and the wearable electronic device comprises:

a storage element configured to store a plurality of application programs and a plurality of audio files;

an audio play element configured to play the plurality of audio files stored in the storage element;

the short-range wireless communication element configured to be in short-range communication with the network communication device, so as to receive the information or the audio file from the network communication device or transmit the information to the network communication device; and a microprocessor electrically connected to the storage element, the audio play element and the short-range wireless communication element respectively, and configured to execute the plurality of application programs to control the audio play element to play the plurality of audio files, and store the audio property of the audio file being played by the audio play element in the storage element to be an audio preference record, and interchange and update the information of the plurality of application programs, the plurality of audio files and the audio preference record with the network communication device through the short-range wireless communication element.

2. The wearable electronic device according to claim 1, further comprising at least one body signal detection element which is electrically connected to the microprocessor and configured to measure a client body signal, and store the client body signal in the storage element to be a body signal record, and interchange the update the information of the body signal record with the network communication device by the short-range communication through the short-range wireless communication element.

3. The wearable electronic device according to claim 2, further comprising at least one positioning element which is electrically connected with the microprocessor and configured to measure a motion message, store the motion message in the storage element to be a motion record, and interchange and update the information of the motion record with the network communication device by the short-range communication through the short-range wireless communication element.

4. The wearable electronic device according to claim 3, wherein the storage element further stores basic information set by a client, and the microprocessor is configured to interchange and update the basic information set by the client with the network communication device by the short-range communication through the short-range wireless communication element.

5. The wearable electronic device according to claim 3, wherein the short-range wireless communication element is a Bluetooth communication element.

6. The wearable electronic device according to claim 4, wherein the short-range wireless communication element is a Bluetooth communication element.

7. The wearable electronic device according to claim 6, wherein the at least one positioning element is a GPS element, a barometer, a magnetometer, a gyroscope or an accelerometer.

8. The wearable electronic device according to claim 5, wherein the at least one positioning element is a GPS element, a barometer, a magnetometer, a gyroscope or an accelerometer.

9. The wearable electronic device according to claim 2, wherein the short-range wireless communication element is a Bluetooth communication element.

10. The wearable electronic device according to claim 9, wherein the at least one positioning element is a GPS element, a barometer, a magnetometer, a gyroscope or an accelerometer.

11. The wearable electronic device according to claim 1, wherein the short-range wireless communication element is a Bluetooth communication element.

12. The wearable electronic device according to claim 11, wherein the at least one positioning element is a GPS element, a barometer, a magnetometer, a gyroscope or an accelerometer.

13. A wearable electronic device having a short-range wireless communication element for updating information stored therein, and applied to an electronic commerce system comprising the wearable electronic device, at least one network communication device, an information management server and at least one streaming audio server, the network communication device respectively linked with the information management server and the at least one streaming audio server through internet network, so as to transmit information to the information management server or receive an audio file from the at least one streaming audio server, wherein the wearable electronic device is configured to be in communication with the network communication device to receive the information or the audio file from the network communication device or transmit the information to the network communication device, and the wearable electronic device comprises:

a broadcast part comprising:
a short-range wireless communication and broadcast element configured to receive the audio file; and
an audio play element electrically connected to the short-range wireless communication and broadcast element and configured to play the audio file;
a relaying part comprising:
a storage element configured to store a plurality of application programs and a plurality of audio files;
a relaying short-range wireless communication element configured to be in short-range communication with the short-range wireless communication and broadcast element and the network communication device, to receive the information or the audio file from the network communication device or transmit information to the network communication device and the short-range wireless communication and broadcast element; and a relaying microprocessor electrically connected to the storage element and the relaying short-range wireless communication element respectively, and configured to execute the plurality of application programs, and control the audio play element to play the plurality of audio files by a push technology through the relaying short-range wireless communication element and the short-range wireless communication and broadcast element, and store an audio property of the audio file being played by the audio play element to be an audio preference record, and interchange and update the information of the plurality of application programs, audio files and the audio preference with the network communication device by the short-range communication through the relaying short-range wireless communication element.

14. The wearable electronic device according to claim 13, wherein the relaying part further comprises at least one body signal detection element which is electrically connected with the relaying microprocessor and configured to measure a client body signal, store the client body signal in the storage element to be a body signal record, and interchange and update information of the body signal record with the network communication device by the short-range communication through the relaying short-range wireless communication element.

15. The wearable electronic device according to claim 14, wherein the relaying part further comprises at least one positioning element which is electrically connected with the relaying microprocessor and configured to measure a motion message, store the motion message in the storage element to be a motion record, and interchange and update information of the motion record with the network communication device by the short-range communication through the relaying short-range wireless communication element.

16. The wearable electronic device according to claim 15, wherein the storage element is configured to store basic information set by a client, and the relaying microprocessor is configured to interchange and update basic information set by the client with the network communication device by the short-range communication through the relaying short-range wireless communication element.

17. The wearable electronic device according to claim 15, wherein the relaying short-range wireless communication element or the short-range wireless communication and broadcast element is a Bluetooth communication element.

18. The wearable electronic device according to claim 17, wherein the positioning element is a GPS element, a barometer, a magnetometer, a gyroscope or an accelerometer.

19. The wearable electronic device according to claim 16, wherein the relaying short-range wireless communication element or the short-range wireless communication and broadcast element is a Bluetooth communication element.

20. The wearable electronic device according to claim 19, wherein the positioning element is a GPS element, a barometer, a magnetometer, a gyroscope or an accelerometer.

21. The wearable electronic device according to claim 14, wherein the relaying short-range wireless communication element or the short-range wireless communication and broadcast element is a Bluetooth communication element.

22. The wearable electronic device according to claim 21, wherein the positioning element is a GPS element, a barometer, a magnetometer, a gyroscope or an accelerometer.

23. The wearable electronic device according to claim 13, wherein the relaying short-range wireless communication element or the short-range wireless communication and broadcast element is a Bluetooth communication element.

24. The wearable electronic device according to claim 23, wherein the positioning element is a GPS element, a barometer, a magnetometer, a gyroscope or an accelerometer.

25. A wearable electronic device having a short-range wireless communication element for updating information stored therein, and applied to an electronic commerce system comprising the wearable electronic device, at least one network communication device, an information management server and at least one streaming audio server, wherein the network communication device respectively is linked with the information management server and the at least one streaming audio server through internet network, so as to transmit information to the information management server or receive an audio file from the at least one streaming audio server, and the wearable electronic device is configured to be in communication with the network communication device to receive the information or the audio file from the network communication device or transmit the information to the network communication device, and the wearable electronic device comprises:
- a broadcast part comprising:
- a short-range wireless communication and broadcast element configured to receive the audio file;
- a first broadcast audio element electrically connected with the short-range wireless communication and broadcast element and configured to play the audio file;
- a relaying part comprising:
- a storage element configured to store a plurality of application programs and a plurality of audio files;
- a relaying short-range wireless communication element configured to be in short-range communication with the network communication device, to receive the information or the audio file from the network communication device, or transmit the information to the network communication device;
- a second broadcast audio element electrically connected with the first broadcast audio element, and configured to transmit the audio file to the first broadcast audio element; and
- a relaying microprocessor electrically connected with the storage element, the relaying short-range wireless communication element and the second broadcast audio element, and configured to execute the plurality of application programs to control the audio play element to play the plurality of audio files through the second broadcast audio element and the first broadcast audio element in a sequential order, and store an audio property of the audio file being played by the audio play element in the storage element to be an audio preference record, and interchange and update information of the plurality of application programs, the plurality of audio files and the audio preference record with the network communication device by the short-range communication through the relaying short-range wireless communication element.

26. The wearable electronic device according to claim 25, wherein the relaying part further comprises at least one body signal detection element which is electrically connected with the relaying microprocessor and configured to measure a client body signal, store the client body signal in the storage element to be a body signal record, and interchange and update the information of the body signal record with the network communication device by the short-range communication through the relaying short-range wireless communication element.

27. The wearable electronic device according to claim 26, wherein the relaying part further comprises at least one positioning element which is electrically connected with the relaying microprocessor and configured to measure a motion message, and store the motion message in the storage element to be a motion record, and interchange and update the information of the motion record with the network communication device by the short-range communication through the relaying short-range wireless communication element.

28. The wearable electronic device according to claim 27, wherein the storage element is configured to store basic information set by a client, and the relaying microprocessor is configured to interchange and update the basic information set by the client with the network communication device by the short-range communication through the relaying short-range wireless communication element.

29. The wearable electronic device according to claim 28, wherein the relaying short-range wireless communication element is a Bluetooth communication element.

30. The wearable electronic device according to claim 29, wherein the at least one positioning element is a GPS element, a barometer, a magnetometer, a gyroscope or an accelerometer.

31. The wearable electronic device according to claim 27, wherein the relaying short-range wireless communication element is a Bluetooth communication element.

32. The wearable electronic device according to claim 31, wherein the at least one positioning element is a GPS element, a barometer, a magnetometer, a gyroscope or an accelerometer.

33. The wearable electronic device according to claim 26, wherein the relaying short-range wireless communication element is a Bluetooth communication element.

34. The wearable electronic device according to claim 33, wherein the at least one positioning element is a GPS element, a barometer, a magnetometer, a gyroscope or an accelerometer.

35. The wearable electronic device according to claim 25, wherein the relaying short-range wireless communication element is a Bluetooth communication element.

36. The wearable electronic device according to claim 35, wherein the at least one positioning element is a GPS element, a barometer, a magnetometer, a gyroscope or an accelerometer.

* * * * *